June 12, 1951 E. ALLAN 2,556,385
APPARATUS FOR TREATING VEGETABLES WITH HOT WATER AND STEAM
Filed Oct. 21, 1947 5 Sheets-Sheet 2

Inventor
Edwin Allan
By
Attorney

June 12, 1951 E. ALLAN 2,556,385
APPARATUS FOR TREATING VEGETABLES WITH HOT WATER AND STEAM
Filed Oct. 21, 1947 5 Sheets-Sheet 5

Inventor
Edwin Allan
By
Frank Keifer
Attorney

Patented June 12, 1951

2,556,385

UNITED STATES PATENT OFFICE 2,556,385

APPARATUS FOR TREATING VEGETABLES WITH HOT WATER AND STEAM

Edwin Allan, Spencerport, N. Y.

Application October 21, 1947, Serial No. 781,134

10 Claims. (Cl. 99—443)

The object of this invention is to provide a processing apparatus for scalding beets, carrots, sweet potatoes and white potatoes and other vegetables.

Another object of the invention is to provide a processing apparatus for peeling fresh vegetables with hot water and steam under pressure above the atmosphere.

Another object of the invention is to make the process continuous, first subjecting the vegetables to treatment under hot water, and then by steam under pressure and high temperature and then by hot water again.

Another object of the invention is to handle the vegetables or the containers that contain the vegetables by an endless conveyor that runs through the water and through the steam chest of the apparatus and then through the water again and then runs back through the open air to the starting point where the vegetables or the containers containing the vegetables are fed through the apparatus by the endless conveyor.

Another object of the invention is to regulate the temperature of the water and the expanded steam so that the water is kept at or near the boiling point (plus or minus) and the steam is kept at a temperature superheated that is near the temperature corresponding to the high boiler pressure from which the steam is drawn and expanded in the steam chest of the apparatus.

In the drawings.

In the accompanying drawings like reference numerals indicate like parts.

In the accompanying drawings reference numeral 1 indicates the housing of the apparatus that contains both the water columns and the steam chest or steam space or steam chamber of the apparatus. Reference numeral 2 indicates the upright intake water column or trunk of the apparatus and the reference numeral 3 indicates the discharge end of the apparatus. Reference numeral 4 indicates the pipe through which water is conveyed into the large tank of the apparatus. Reference numerals 5, 6 and 7 indicate drains through which the water and mud is drained from the apparatus. Reference numeral 8 indicates the pipe which conveys the steam from the boiler. Reference numeral 9 indicates the valve which controls the admission of steam, and 10 indicates the pipe outside of the tank through which the steam is fed into the tank. Reference numerals 11, 12, 13 and 14 indicate the connections through which the steam is passed into the water tank for the purpose of heating the water.

These connections or pipes extend across the inside of the tank near the bottom and are perforated as indicated at $11a, 12a, 13a$ and $14a$. A regulator 15 that regulates the temperature of the water is provided outside of the tank from which a small tube 16 extends to an opening 17 through which it passes to the inside of the tank where it is attached to a thermal unit, this being standard equipment constituting no part of my invention. This regulator is a device made by the Taylor Instrument Company of Rochester, New York.

This device is illustrated and described in Patent No. 1,995,390 issued to Hubbard on March 26, 1935.

The water in the tank is heated by steam and when the temperature of the water exceeds 210° or whatever temperature the regulator is set for the valve in the bottom of the regulator will close and the flow of steam into the water of the tank will be shut off, and when the temperature of the water in this part of the tank drops below 210° or the critical point at which the instrument was set for, the valve will open and permit more steam to come into the tank through the lower openings 11a, 12a, 13a and 14a and heat the water. At 210° F., the level of the water in the tank under the steam space and in the water column will be substantially the same.

It will be understood that because of the pressure under which the water is placed by the water columns of the tank the temperature of the water can go several degrees above 212° without boiling and when the water contains sugar that leaches from the vegetables, such as beets and sweet potatoes, the temperature of the water can go even higher before it begins to boil.

Across the top of the tank extends the steam tight cover 18 having a baffle 19 near the forward end of the tank and a corresponding baffle 20 near the rear end of the tank. These baffles extend across the tank from one side of the tank to the other and are sealed on each side to the side walls of the tank. Each of these baffles extend downward into the tank leaving an opening between the bottom of the baffle and the bottom of the tank through which the water and endless conveyor can circulate.

The ends of the tank extend outside of these baffles and the parts of the tank that extend outside of these baffles constitute the water columns by which pressure is applied to the water that is contained in the central part of the tank, it being understood that the level of the water in these water columns is fixed by the overflow outlets 21 and 22.

On the outside of the tank is provided the overflow pipe 23 having a valve 24. Water is admitted to the tank through the intake pipe 4 until it runs out through the overflow pipe 23 at which point the water line 4 and the valve 24 is closed. The height of the water in the tank can be observed through the gauge glass 25 which is placed on the outside of the tank. Thereafter the water is heated by passing the steam into it from the boiler through the pipe 10. When the water gets to a temperature of about 210° the flow of steam through the pipe 10 is cut off or reduced by the thermostat control 15.

Thereafter steam is introduced from the boiler through the pipe 26 and the pipe 27 through which it is distributed to the intakes 28, 29, 30, 31, 32 and 33. These pipes go through and extend across the tank. On the inside of the tank, these pipes are perforated. Steam is admitted through these pipes to the top of the tank with a boiler pressure of approximately one hundred pounds, the steam being ordinarily saturated. As the pressure rises in the upper part of the tank, the water is forced down toward the lower end of the baffles 19 and 20 and the water is forced up in the water columns 34 and 35 until the water reaches the top of the overflow pipes 21 and 22 which pipes fix the level of the water in the water column. The difference in elevation of the water between the top of these pipes and the level of the water in the steam chest as indicated at 37, 37 in Figures 4 and 5 indicates the pressure of the water at the bottom of the tank and the pressure of the steam in the steam chamber, it being understood that the intermediate part of the tank is the steam chamber.

Figure 4:
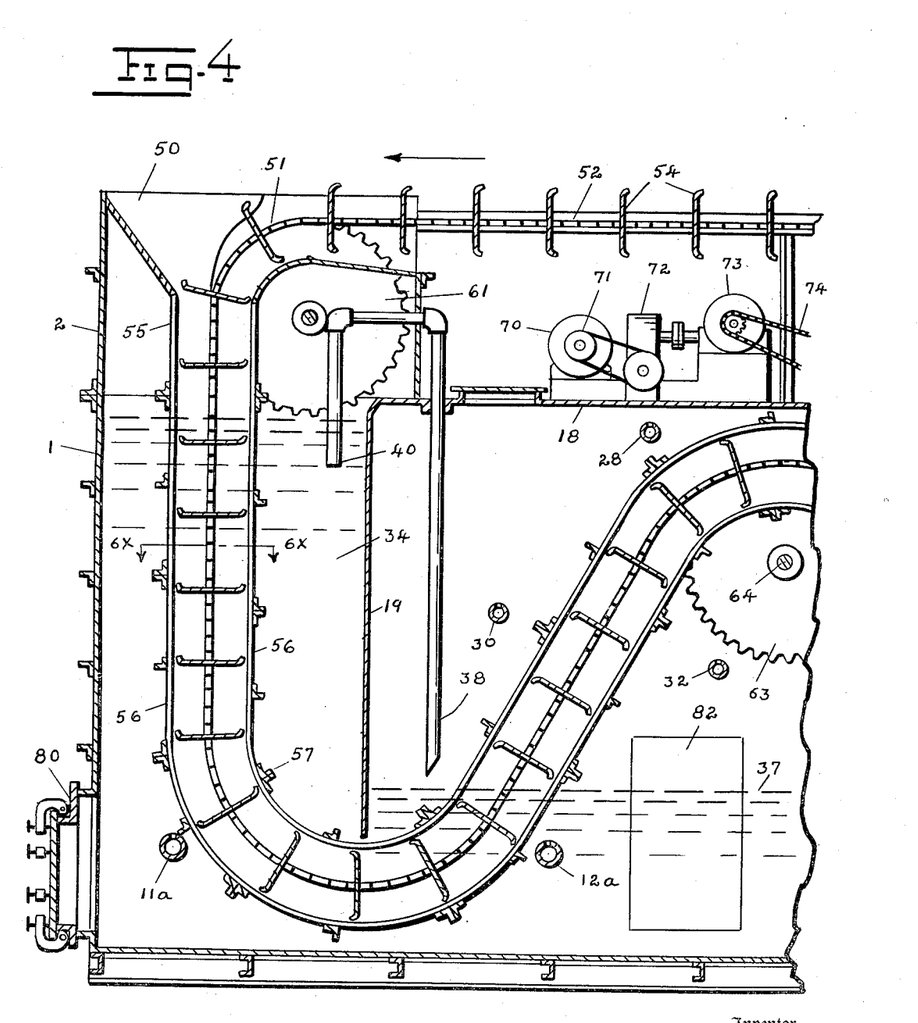
Figure 4 is a vertical section on the line $4x, 4x$ shown in Figure 2, the motor and reducing gear being arbitrarily super imposed in this figure corresponding to the showing of it in Figure 1.
Figure 5:
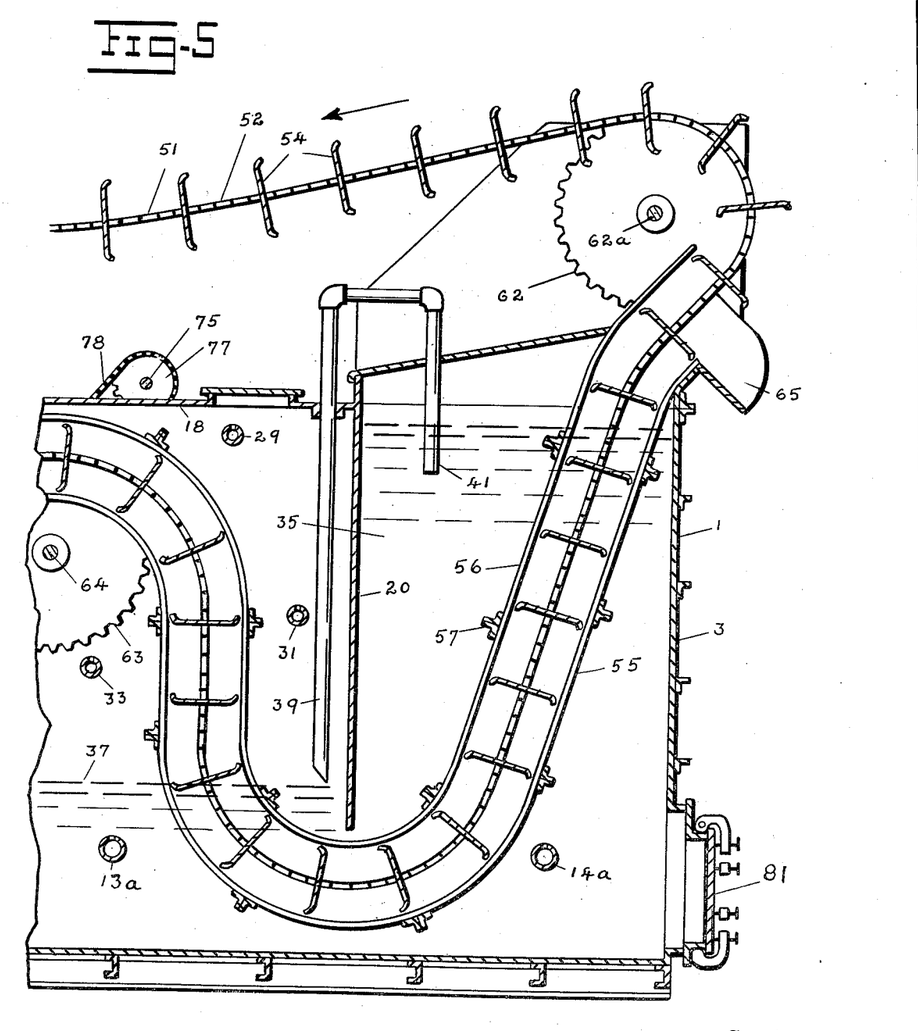
Figure 5 is a vertical section through the apparatus on the line $5x, 5x$ of Figure 3. It will be understood that Figures 2, 3, 4 and 5 show the parts suitably enlarged over the scale used in Figure 1.

When the level of the water is established in the steam chamber as shown in Figures 4 and 5, the air in the steam chest and some of the steam is forced out through the bottom of the pipes 38 and 39 through which the steam and air travels up and across and down through the outlets 40 and 41. The lower ends of the outlet pipes 40 and 41 are submerged in the water that is raised in the water columns when the water is forced down in the middle portion of the tank by the admission of steam. As the water is forced down, the lower ends of the pipes 38 and 39 are uncovered from the water. As the lower ends of the pipes 38 are beveled and have inclined oval openings, the upper ends of the openings will be uncovered first and air and steam can then pass up into the pipes. At the same time water can then drip or run down from the pipes 38 and 39 into the tank below the steam chamber. This reduces the downward pressure of the water that remains in the pipes. When the heighth of water in the pipes or the pressure thereof is sufficiently reduced, the pressure in the steam chamber causes the steam or the steam and air to push the rest of the water out of the pipes and over into the water columns. Steam will then flow through the pipes into the water columns. Because the opening at the bottom of the pipe 38 is higher than the opening at the bottom of the pipe 39, the pipe 38 will open first, and more steam will pass into the water column 34 where it is needed to heat the cold fresh vegetables that are fed into the runway in this water column. Less steam is needed in the water column 35 because by the time the vegetables reach there they have taken on a high temperature.

When steam flows through the pipes 38 and 39, it forces the water down in the short ends 40 and 41 of the pipes into the water column, thereby creating a back pressure that adds to the pressure in the steam chamber. Because the steam is discharged into the water column below the water level, it heats the water more efficiently and the atmosphere in the scalding part of the canning factory is kept that much freer from steam than it would be if the steam was discharged into the open air or if the vegetables were scalded in an open tank.

Steam or air can pass into the beveled opening of the pipe 39 before the beveled opening is fully opened and this will cause a gurgling sound in the beveled opening of the pipe 39 and the same thing can happen in the beveled opening for the pipe 38. When the pipes 38 and 39 are open for the passage of steam out of the steam chamber it allows steam to constantly flow into the steam chamber through the upper openings 28, 29, 30, 31, 32 and 33, thus maintaining a higher temperature than would ordinarily be found with a pressure of from two and a half to three and a half pounds. This supplies super heated steam through the steam chamber so that a temperature of as much as 230° F. can be attained for scalding at this low pressure. Because of the low steam pressure used, the steam chamber of the scalding apparatus can be built of lighter steel than would be needed if the pressure were higher and the water columns do not have to be so high.

The pipes 38 and 39 are made long and extend well down and into the steam chest so that steam cannot pass through them until a sufficient pressure has been developed in the steam chest and the water in the tank below the steam chest has been pushed down and the water in the water column has been pushed up to cover or submerge the ends of the pipes 40 and 41. This makes it certain that when steam does escape it will be condensed in the water columns and will heat the water and the heighth of the water columns will cause a back pressure in the pipes that will restrain or regulate the flow of steam.

The air is soon blown out of the steam chest and thereafter nothing but steam passes out through the pipes 38 and 39 into the water column.

The level of the water in the steam chest fluctuates. As the temperature of the steam chest drops, the water rises to wholly or partially close the oval openings at the lower ends of the pipes 38 and 39 and then the temperature in the steam chest rises again probably increasing the pressure in the steam chest and forcing the water down again until the oval openings at the bottom of the pipes are uncovered.

It will also be understood that the intake of the pipe 38 is about two inches higher than the intake of the pipe 39 so that more steam will flow through the pipe 38 into the water column 34 then into the water column 35 with the result that the water column 34 will be kept at a higher temperature or will absorb more heat than the water column 35. This is necessary because the beets or other vegetables that are introduced into the water column 34 are cold and must be warmed up while the beets that are discharged into the water column 35 are discharged at a high temperature.

Steam is admitted to the steam chest at a high temperature, much higher than the boiling point of the water and it condenses and heats the water until an equilibrium is established. It also presses the water down until it uncovers the oval openings at the lower ends of the pipes 38 and 39 as above described and maintains a super heat in the steam space above the water.

This insures a continuous or more nearly continuous flow of super heated steam at high temperature into the steam chest through the pipes 28, 29, 30, 31, 32 and 33 than would otherwise be possible thereby maintaining a high temperature in the steam chest. In this way a temperature of as much as 230° F. can be attained in the steam chest with a pressure of about 2¾ pounds. The valve through which steam is admitted to the steam chest is controlled by a regulator 42 which regulates the rate at which steam is allowed to pass into the steam chest. This valve and control is made by the Taylor Instrument Companies of Rochester, New York and is shown in Patent No. 2,088,055 issued to Foote, July 27, 1937.

The vegetables are subjected to this superheated steam as they pass through the steam space. The length of each chain in the steam space is about fifteen feet. The length of each chain in the water space at each end of the steam space is about fifteen feet.

At the top of the water column 34 is a hopper 50 into which the vegetables are dumped continuously. Through this hopper and through the apparatus runs an endless conveyor 51 that will now be described.

This conveyor consists of two endless chains 52 and 53 between which is carried metal flights 54. These flights are 12 inches high and 34½ inches wide. These flights move through a long rectangular cage or runway 55, which is closed on two sides with metal slats 56 which are suitably spaced apart so that the hot water or the steam can flow into or out of the runway. These slats are welded to angle irons 57 which in turn are bolted to plates 58 which are welded between the housing 1 on one side and plates 59, 59 which plates constitute the other two sides of the cage.

This runway is referred to as a skeleton runway, in that it is not a tight runway, but is open on two sides so that hot water and steam can flow into and out of it from the water column, the tank and steam space. It is enclosed on four sides.

Certain links of the chain are provided with inwardly projecting lugs 60 to which the flights 54 are attached. It will be understood that the housing is about twenty-three feet long, and about forty-four inches wide and the heighth of the intake column is about twelve feet and the heighth of the discharge end is about fourteen feet and the heighth of the intermediate part of the steam chest is about nine feet. These measurements are from the ground up and from them the heighth of the water in the steam chest and the water columns can be estimated, allowances being made for fluctuation as above explained.

The endless chains move over three pair of sprocket wheels 61, 62 and 63 and they move from right to left as shown at the top of Figures 4 and 5. The vegetables are dumped into a hopper 50 so that the space between the flights 54 are from fifty to eighty percent full, and are carried down through the water column 34 and submerged in hot water by which they are moistened and heated. This chain moves approximately at a varying rate of from one and one-half feet a minute to fifteen feet a minute. For beets fresh from the ground the chain would run about four feet a minute. If they were out of the ground four months the chain would run about one and one-half feet a minute, thus exposing the beets to a longer period of scalding. Carrots, sweet potatoes and Irish potatoes would require full speed on the chain, if fresh out of the ground, and at a much slower speed if they had a chance to dry out.

It will also be understood that the total length of the apparatus is about twenty-four feet and the total length of each chain is about sixty-five feet. Nearly 45 feet of each chain is travelling through water or into the steam space.

At the lower end of the column the flights move around in a path that is almost semicircular, the runway being curved so as to pass under the baffle 19. The runway then slopes upwardly and the chains are drawn by a pair of sprocket gears 63. After the vegetables have passed under the baffle 19, they are carried or pushed above the water level 37 and into the steam space over the sprocket wheels 63 and the shaft 64 which carries them.

Figure 1:
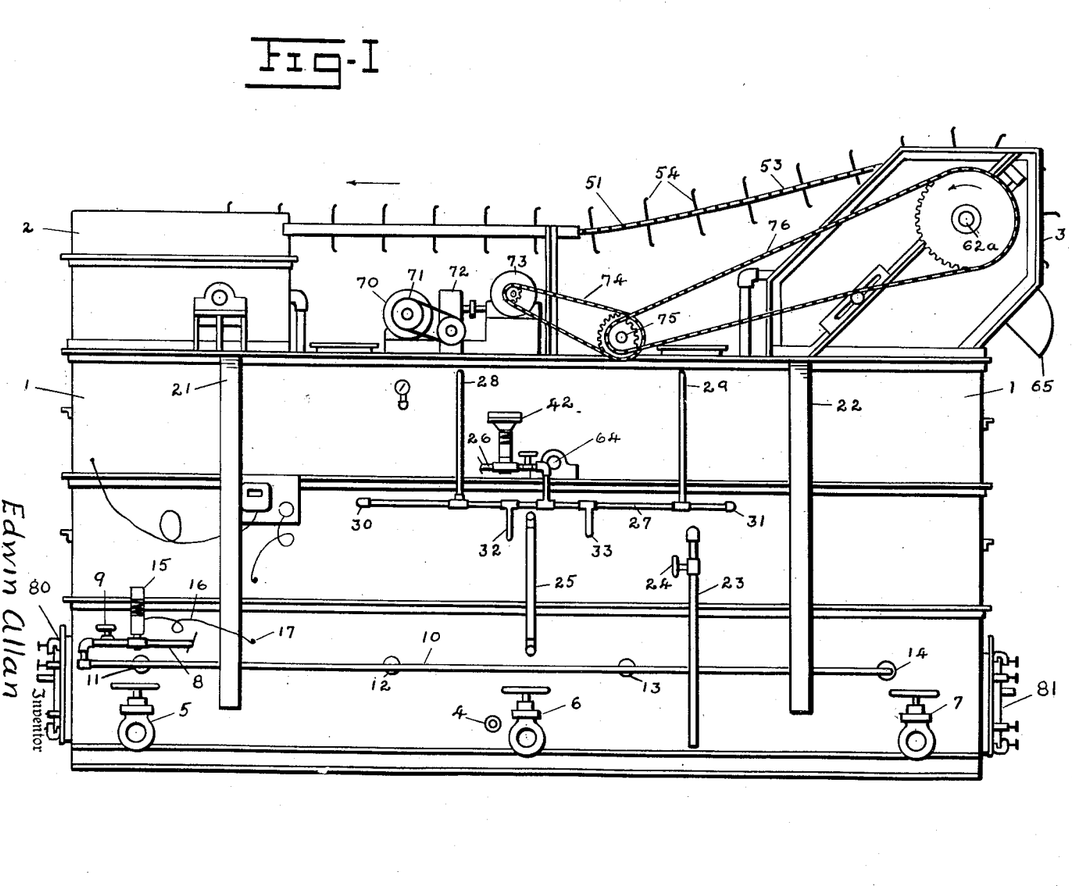
Figure 1 is a side elevation of the apparatus when viewed from the outside.

They are then carried down to the water level again and under the water and under the baffle 20 and up again through the water column 35 until they are finally discharged in the chute 65. The endless chains 52 and 53 with their flights 54 continue around through the open air above the steam chest and pass over the sprocket wheels 61 and down into the water column 34. This cycle of operations is continued indefinitely. The speed at which the chains can be driven is varied by the apparatus shown at the top of Figure 1, in which 70 is the electric motor. It has been found that an electric motor of 1 H. P. or 1½ H. P. is sufficient to drive the loaded apparatus at the different speeds. 71 is a variable speed pulley which drives a smaller pulley on the reducing gear 72 which in turn drives a second speed reducing gear 73 which in turn drives a chain 74 which in turn drives the gear and a jack shaft 75. This jack shaft 75 in turn drives a chain 76 which in turn drives a sprocket and shaft 62a, on which shaft 62a (see Figure 3) are carried the two sprockets 63 on the inside of the machine. The jack shaft 75 (see Figure 1) has a sprocket wheel 77 at the other end thereof (see Figure 5) which drives a chain 78. This chain 78 drives a sprocket on the outside of the machine carried on the shaft 64 (see Figure 2). This shaft 64 carries two sprockets 63 on the inside of the machine.

It will also be understood that the velocity of the endless conveyor 51 must vary between wide limits because of the character of the vegetables being processed. Beets are scalded in steam much more slowly than sweet potatoes and carrots and therefore require about three times as long processing by hot water and steam as would be required for processing sweet potatoes and carrots. The gearing shown at the top of Figure 1 must be such as would drive the conveyor 51 at the speed required for the speed of the particular vegetables being processed.

It will also be understood that in processing beets most efficiently about four hundred gallons of water or steam must pass through the boiler and the apparatus per hour and in processing the same amount of carrots and sweet potatoes about one-third of this amount of water or steam is sufficient.

It will also be understood that dirt will accumulate in the tank being washed off of the vegetables and that manholes 80 and 81 are provided at the opposite ends of the tank and a manhole 82 is provided at an intermediate part of the tank through which the dirt can be cleaned out from the housing from time to time as it accumulates.

It will also be understood that the vegetables are washed in a separate apparatus before being put through this apparatus so that all stones and most of the dirt is removed from the vegetables before the processing of them in this apparatus begins. This, however, constitutes no part of my invention.

That part of the chains 52 and 53 shown in Figure 4 are supported by angle irons which angle irons are supported at one end by the uprights 92 and at the other end are supported by the trunk 3. By these angle irons the chains are held in horizontal position as they approach the sprocket wheel 61.

Figure 2:
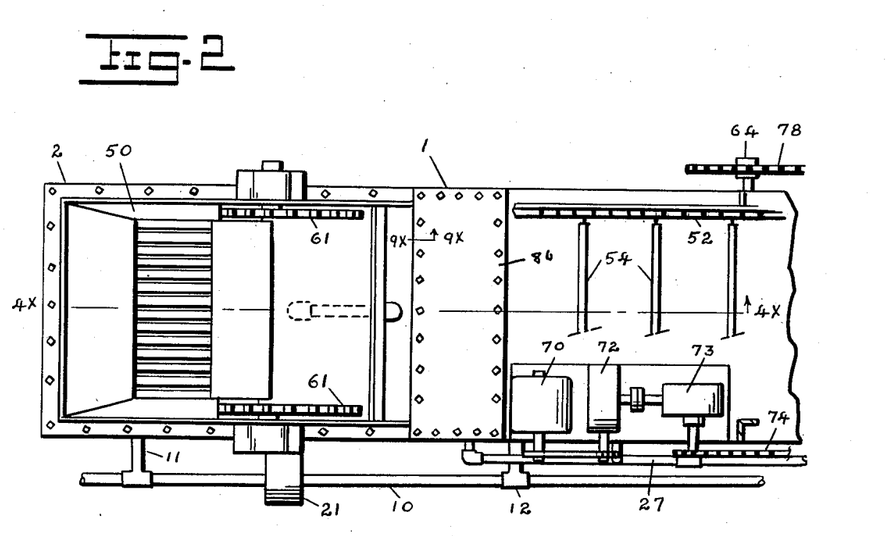
Figure 2 is a top plan view of the left hand portion of the apparatus as shown in Figure 1, most of the flights and chains being broken away.
Figure 3:
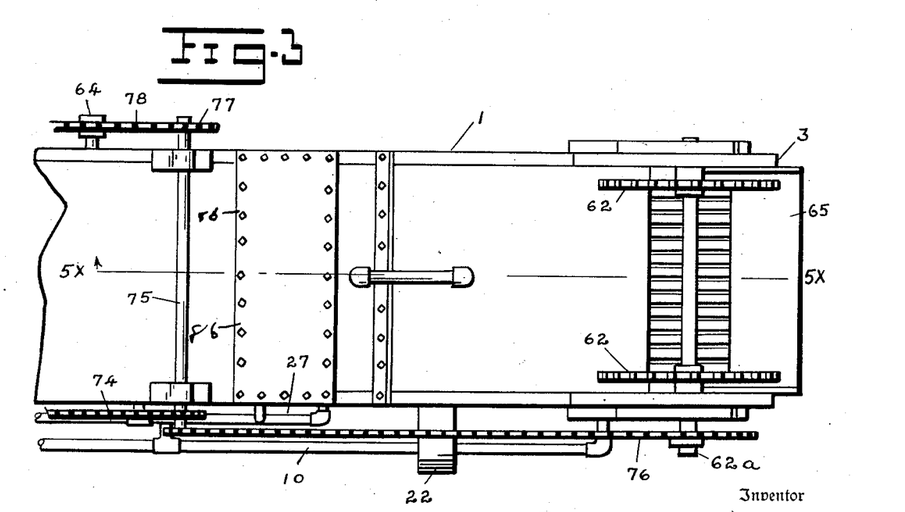
Figure 3 is a top plan view of the right hand portion of the apparatus as shown in Figure 1, the flights and chains omitted.
Figures 6, 7, 8, 9:
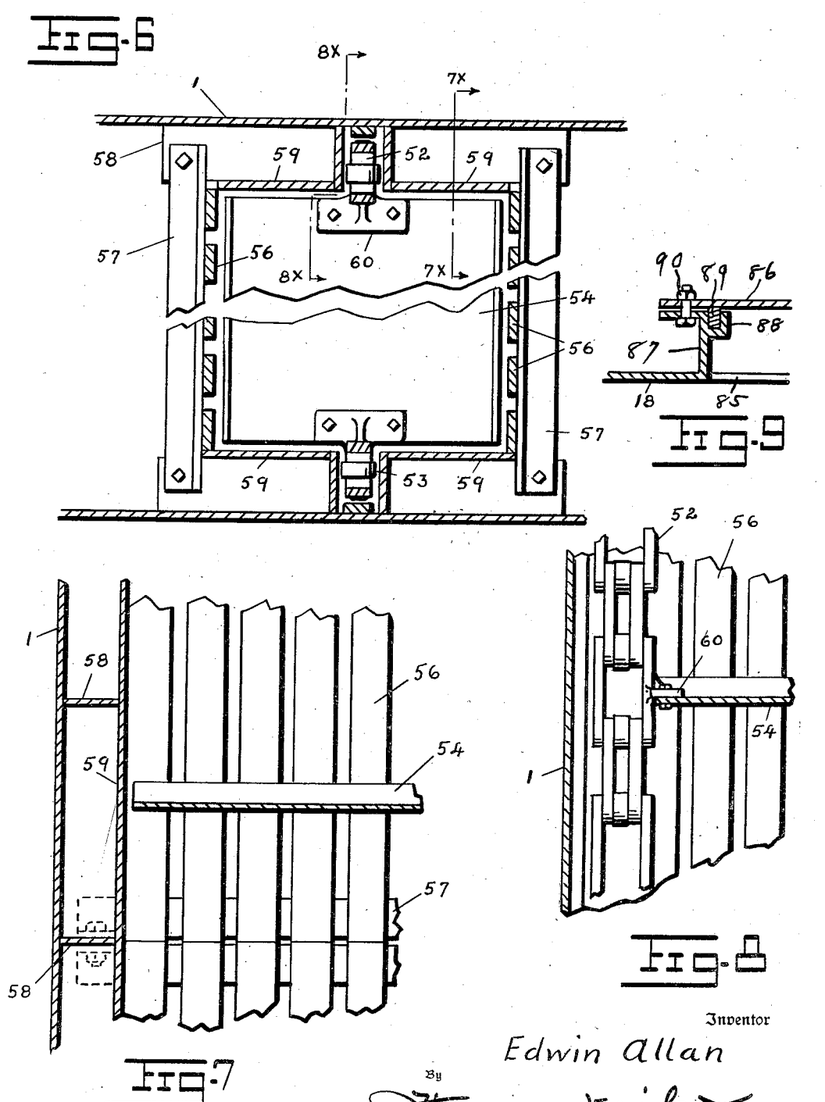
Figure 6 is a horizontal section on the line $6x, 6x$ of Figure 4 showing the two endless chains on the opposite side of the conveyor and one of the metal flights carried between them.
Figure 7 is a section on the line $7x, 7x$ of Figure 6 showing the chute or cage through which the endless conveyor travels from the intake end of the machine to the discharge end of the apparatus.
Figure 8 is a detail view showing the endless chain and conveyor in section, the section being taken on the line $8x, 8x$ of Figure 6.
Figure 9 is a section on the line $9x, 9x$ of Figure 2 showing the seal used on various clean-out doors.

In Figure 9 I have shown a cross section of the manhole and its cover as it appears in Figures 2 and 3. The top of the housing is bent up and over to form a large channel around the manhole 85 as indicated at 87.

On the inside of the manhole is formed a small channel 88. A coverplate 86 is placed over the large channel and between the coverplate and the small channel is a gasket 89. The coverplate is bolted in place by bolts 90.

I claim:

1. In an apparatus for scalding vegetables in bulk, the combination of a housing comprising a steam space closed at the top and open at the bottom, a tank of water at the bottom of said housing into which said steam space opens, a water column enclosed in said housing at each end of the steam space, the water in said column being open at the top and opening at the bottom into said tank of water, the water in said columns exerting pressure on the steam in the steam space through said tank of water, a pipe in the steam space near one end thereof extending up through the top of the steam space and discharging into the water of the adjacent water column under the surface thereof, said pipe having its lower end beveled with a bevel opening.

2. In an apparatus for scalding vegetables in bulk, the combination of a housing comprising a steam space closed at the top and open at the bottom, a tank of water at the bottom of said housing into which said steam space opens, a water column enclosed in said housing at each end of the steam space, said water column being open at the top and opening at the bottom into said tank of water, the water in said columns exerting pressure on the steam in the steam space through said tank of water, a pipe in the steam space, said pipe being open at the bottom in the steam space and extending up through the top of the steam space and discharging into the water of the adjacent water column below the surface of the water, said pipe having its lower end beveled with a beveled opening.

3. In an apparatus for scalding vegetables in bulk, the combination of a housing comprising a steam space closed at the top and open at the bottom, a tank of water at the bottom of said housing into which said steam space opens, a water column enclosed in said housing at each end of the steam space, said water column being open at the top and opening at the bottom into said tank of water, the water in said columns exerting pressure on the steam in the steam space through said tank of water, pipes in the steam space, one near each end of the steam space, said pipes being open at the bottom in the steam space and extending up through the top of the steam space and discharging into the water of the adjacent water column below the surface of the water, the lower end of one pipe being somewhat higher with respect to the water level in the steam space than the lower end of the other pipe.

4. Apparatus for scalding vegetables in bulk, comprising a tank which is open at its top, a steam chamber formed within said tank and open only at its bottom, its bottom being above the bottom of said tank but communicating with said tank, said steam chamber being covered at its top by a steam-tight cover, one end of said steam chamber being formed by a baffle plate which has a steam-tight connection at its top with the cover of said steam chamber and which terminates above the bottom of said tank and which is spaced from the adjacent outside wall of said tank so that a water column is formed between said adjacent outside wall and said steam chamber communicating with said steam chamber, means for supplying water to said tank, means for supplying steam into the upper part of said steam chamber to force water out of said steam chamber into said water column, a water overflow from said water column, a pipe extending from said steam chamber through the cover of said steam chamber into said water column, said pipe being open at both ends and that end of said pipe which is in said water column being below said overflow but above the other end of said pipe which is in the steam chamber, and means for conveying vegetables in bulk from the top of said water column down through said water column under said baffle plate up into said steam chamber and to a point of discharge adjacent the top of said tank.

5. Apparatus for scalding vegetables in bulk, comprising a tank which is open at its top, a steam chamber formed within said tank and open only at its bottom, its bottom being above the bottom of said tank, said steam chamber being covered at its top by a steam-tight cover, one end of said steam chamber being formed by a baffle plate which has a steam-tight connection at its top with the cover of said steam chamber and which terminates above the bottom of said tank and which is spaced from the adjacent outside wall of said tank so that a water column is formed between said adjacent outside wall and said steam chamber communicating with said steam chamber, means for supplying water to said tank, means for supplying steam into the upper part of said steam chamber to force water out of said steam chamber into said water column, a water overflow from said water column, a pipe extending from said steam chamber through the cover of said steam chamber into said water column, said pipe being open at both ends and that end of said pipe which is in said water column being below said overflow but above the other end of said pipe which is in the steam chamber, and an endless conveyor for conveying vegetables in bulk from the top of said water column down through said water column under said baffle plate up into said steam chamber to a point of discharge adjacent the top of said tank, said conveyor extending thence over the top of said steam chamber back to the top of said water column, and means for driving said conveyor.

6. Apparatus for scalding vegetables in bulk comprising a tank having a pair of spaced side walls, a pair of spaced end walls connecting said side walls, and a closed bottom, a steam chamber formed within said tank by a pair of baffle plates and a cover, said baffle plates extending entirely across said steam chamber from side wall to side wall thereof and adjoining said cover with steam-tight connections, said baffle plates terminating above the bottom of said tank and being disposed between the end walls of said tank and spaced from said end walls, thereby to form water columns at opposite ends of said tank which communicate with said steam chamber, said cover being steam-tight and extending over the whole of said steam chamber, means for supplying water to said tank, means for supplying steam into the upper part of said steam chamber to force water out of said steam chamber into said water columns, a water overflow from each water column, a pipe extending from said steam chamber through the cover of said steam chamber into each water column, each pipe being open at both its ends, that end of each pipe which is in a water column being below the overflow for that water column but above the other end of that pipe, an endless conveyor for conveying vegetables in bulk from the top of one of said water columns down through said one column under the adjoining baffle plate, up into said steam chamber, down under the other baffle plate and up to the top of the other water column for discharge from said tank, and means for driving said conveyor.

7. Apparatus for scalding vegetables in bulk comprising a tank having a pair of spaced side walls, a pair of spaced end walls connecting said side walls, and a closed bottom, a steam chamber formed within said tank by a pair of baffle plates and a cover, said baffle plates extending entirely across said steam chamber from side wall to side wall thereof and adjoining said cover with steam-tight connections, said baffle plates terminating above the bottom of said tank and being disposed between the end walls of said tank and spaced from said end walls, thereby to form water columns at opposite ends of said tank which communicate with said steam chamber, said cover being steam-tight and extending over the whole of said steam chamber, means for supplying water to said tank, means for supplying steam into the upper part of said steam chamber to force water out of said steam chamber into said water columns, a water overflow from each water column, a pipe extending from said steam chamber through the cover of said steam chamber into each water column, each pipe being open at both its ends, that end of each pipe which is in a water column being below the overflow for that water column but above the other end of that pipe, an endless conveyor for conveying vegetables in bulk from the top of one of said water columns down through said one column under the adjoining baffle plate, up into said steam chamber, down under the other baffle plate and up to the top of the other water column for discharge from said tank, and means for driving said conveyor, the pipe, which connects the steam chamber with the water column which is at the discharge end of said tank, having the end of it which communicates with said steam chamber below the corresponding end of the other pipe whereby steam will flow out of said steam chamber into the water column at the receiving end of said tank before it flows into the water column at the discharge end of said tank.

8. Apparatus for scalding vegetables in bulk comprising a tank having a pair of spaced side walls, a pair of spaced end walls connecting said side walls, and a closed bottom, a steam chamber formed within said tank by a pair of baffle plates and a cover, said baffle plates extending entirely across said steam chamber from side wall to side wall thereof and adjoining said cover with steam-tight connections, said baffle plates terminating above the bottom of said tank and being disposed between the end walls of said tank and spaced from said end walls, thereby to form water columns at opposite ends of said tank which communicate with said steam chamber, said cover being steam-tight and extending over the whole of said steam chamber, means for supplying water to said tank, means for supplying steam into the upper part of said steam chamber to force water out of said steam chamber into said water columns, a water overflow from each water column, a pipe extending from said steam chamber through the cover of said steam chamber into each water column, each pipe being open at both its ends, that end of each pipe which is in a water column being below the overflow for that water column but above the other end of that pipe, an endless conveyor for conveying vegetables in bulk from the top of one of said water columns down through said one column under the adjoining baffle plate, up into said steam chamber, down under the other baffle plate and up to the top of the other water column for discharge from said tank, and means for driving said conveyor, the pipe, which connects the steam chamber with the water column which is at the discharge end of said tank, having the end of it which communicates with said steam chamber below the corresponding end of the other pipe whereby steam will flow out of said steam chamber into the water column at the receiving end of said tank before it flows into the water column at the discharge end of said tank, and each of said pipes being beveled at the end which is in said steam chamber, to provide an oval opening at that end of the pipe.

9. Apparatus for scalding vegetables in bulk, comprising a tank having a pair of spaced side walls, a pair of spaced end walls connecting said side walls, and a closed bottom, a steam chamber formed within said tank by a pair of baffle plates and a cover, said baffle plates extending entirely across said tank from side wall to side wall thereof and adjoining said cover with steam-tight connections, said baffle plates terminating above the bottom of said tank and being disposed between the end walls of said tank and spaced from said end walls, thereby to form water columns at opposite ends of said tank which communicate with said steam chamber, said cover being steam-tight and extending over the whole of said steam chamber, means for supplying water to said tank, means for maintaining said water at a predetermined temperature, means for supplying steam at a controlled rate into the upper part of said chamber to force water out of said steam chamber into said water columns, a water overflow from each water column, a pipe extending from said steam chamber through the cover of said steam chamber into each water column, each pipe being open at both its ends, that end of each pipe which is in a water column being below the overflow for that water column but above the other end of that pipe, a hopper at the top of one of said water columns, a discharge chute adjacent the top of the other water column, and an endless conveyor for conveying vegetables from said hopper down through the hopper-topped water column, under the adjoining baffle plate, up into said steam chamber adjacent the top thereof, down under the other baffle plate and to said discharge chute, said conveyor extending thence back to the hopper.

10. Apparatus for scalding vegetables in bulk, comprising a tank having a pair of spaced side walls, a pair of spaced end walls connecting said side walls, and a closed bottom, a steam chamber formed within said tank by a pair of baffle plates and a cover, said baffle plates extending entirely across said tank from side wall to side wall thereof and adjoining said cover with steam-tight connections, said baffle plates terminating above the bottom of said tank and being disposed between the end walls of said tank and spaced from said end walls, thereby to form water columns at opposite ends of said tank which communicate with said steam chamber, said cover being steam-tight and extending over the whole of said steam chamber, means for supplying water to said tank, means for supplying steam to said tank to heat said water, means controlling said steam supplying means to maintain said water at a predetermined temperature, means for supplying steam at a controlled rate into the upper part of said chamber to force water out of said chamber into said water columns, a water overflow from each water column, a pipe extending from said steam chamber through the cover of said steam chamber into each water column, each pipe being open at both its ends, a hopper at the top of one water column, a discharge chute adjacent the top of the other water column, that end of each pipe which is in a water column being below the overflow for that water column but above the other end of that pipe, and that pipe which communicates with the hopper-topped water column having the end of it which is in the steam chamber above the corresponding end of the other pipe, and an endless conveyor for conveying vegetables from said hopper down through the hopper-topped water column, under the adjoining baffle plate, up into said steam chamber adjacent the top thereof, down under the other baffle plate and to said discharge chute, said conveyor extending thence back over the top of said steam chamber to the hopper.

EDWIN ALLAN.

REFERENCES CITED

The following references are of record in the file of this patent:

UNITED STATES PATENTS

| Number | Name | Date |
|---|---|---|
| 524,842 | Schenck | Aug. 21, 1894 |
| 1,419,139 | Hunter | June 3, 1922 |
| 1,518,430 | Hurst et al. | Dec. 9, 1924 |
| 1,584,397 | Paxton | May 11, 1926 |
| 2,088,966 | Lyons | Aug. 3, 1937 |
| 2,110,204 | Danis | Mar. 8, 1938 |

FOREIGN PATENTS

| Number | Country | Date |
|---|---|---|
| 431,844 | Great Britain | Mar. 1, 1935 |